W. H. SAUVAGE.
AUTOMATIC SLACK ADJUSTER.
APPLICATION FILED JAN. 2, 1915.
1,183,908.
Patented May 23, 1916.
3 SHEETS—SHEET 3.
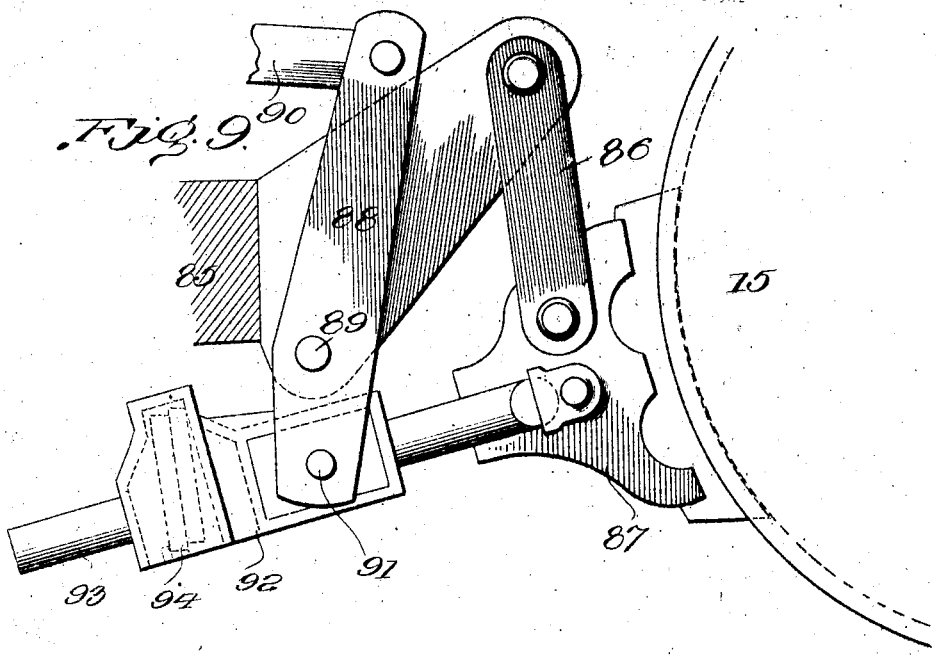
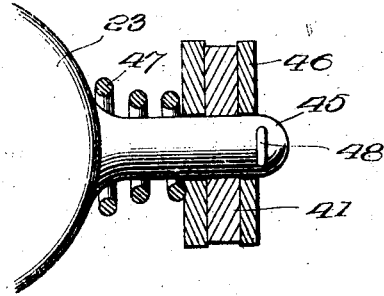
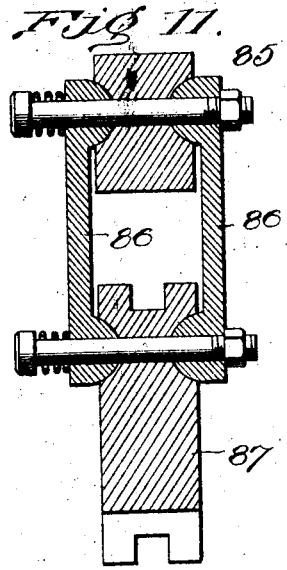
Witnesses
Inventor
W. H. Sauvage
By P. H. Blair
Attorney

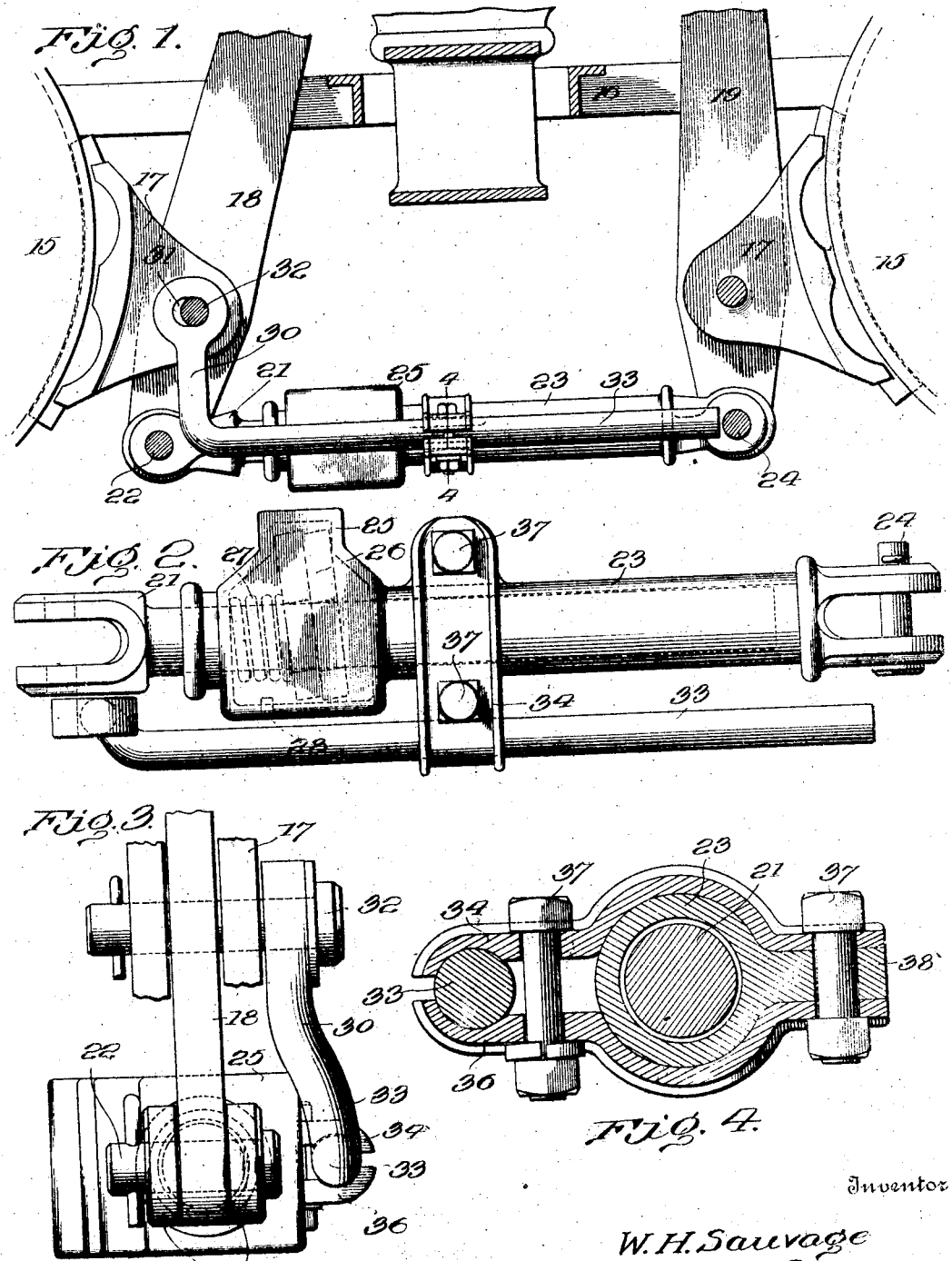

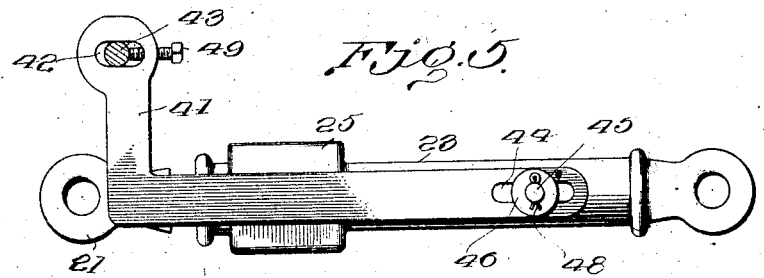
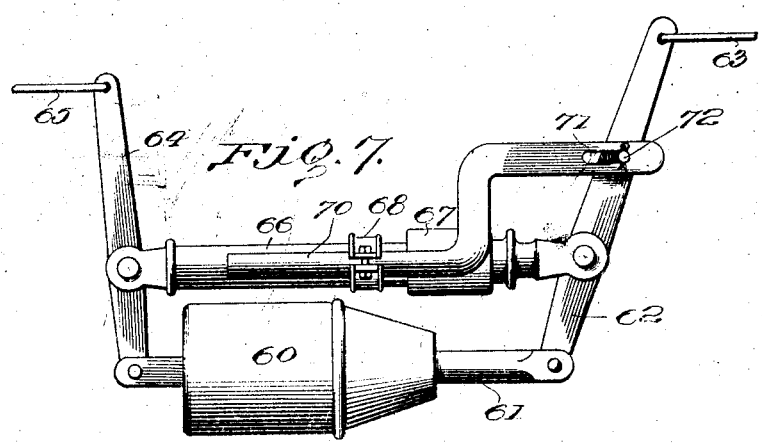
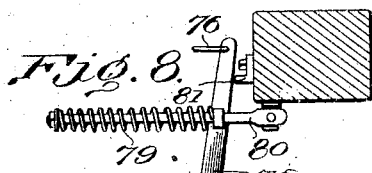

UNITED STATES PATENT OFFICE.

WILLIAM H. SAUVAGE, OF NEW YORK, N. Y., ASSIGNOR, BY MESNE ASSIGNMENTS, TO GOULD COUPLER COMPANY, A CORPORATION OF NEW YORK.

AUTOMATIC SLACK-ADJUSTER.

1,183,908.   Specification of Letters Patent.   Patented May 23, 1916.

Application filed January 2, 1915. Serial No. 105.

*To all whom it may concern:*

Be it known that I, WILLIAM H. SAUVAGE, a citizen of the United States of America, residing at New York, in the county of New York and State of New York, have invented certain new and useful Improvements in Automatic Slack-Adjusters, of which the following is a specification.

This invention relates to automatic slack adjusters for brake rigging of railway cars and the like.

Among the several objects within the contemplation of this invention is the provision of a practical and simple automatic slack adjuster which will be highly efficient and reliable in use and operation at all times.

Another object is to provide a slack adjuster of the above character having few parts which will be inexpensive to manufacture and install.

A further object is to provide a slack adjuster which will be durable in construction and be applicable to either beam or beamless trucks now in use without material alterations.

Other objects will be in part obvious from the annexed drawings and in part indicated in connection therewith by the following analysis of this invention.

This invention accordingly consists in the features of construction, combination of parts, and in the unique relations of the members and in the relative proportioning and disposition thereof: all as more completely outlined herein.

To enable others skilled in the art fully to comprehend the underlying features thereof that they may embody the same in the numerous modifications in structure and relation contemplated by this invention, drawings depicting a preferred form have been annexed as a part of this disclosure, and in such drawings, like characters of reference denote corresponding parts throughout all the views, of which:—

Figure 1 is a side elevation of one form of the present invention applied to a beamless truck showing only such parts as are necessary to obtain a clear understanding thereof: Fig. 2 is a top plan view of the adjuster by itself; Fig. 3 is an end view of the parts shown in Fig. 2; Fig. 4 is a detail sectional view taken on line 4—4 of Fig. 1; Fig. 5 is a modification similar to Fig. 1 showing the adjuster alone with a different form of yielding pivotal friction device; Fig. 6 is a similar view showing a reversal in location of friction and lost motion devices; Fig. 7 is a view similar to Fig. 6 showing the application of the present invention to the brake cylinder levers; Fig. 8 shows a modification applied to a single beam maximum traction truck; Fig. 9 shows another modification in side elevation applied to a part of a beamless brake truck; Fig. 10 is a detail view of a part of Fig. 5; and Fig. 11 is a detail end elevation of the half ball bearings shown in Fig. 9.

To those familiar with the present art, it is probably unnecessary to emphasize certain desirable features of slack adjusters. It may, however, be noted in passing that a predetermined travel of the source of power, for example, the cylinder piston or hand brake is practically necessary in order to efficiently operate the brakes under varying conditions and wear of the brake shoes. Furthermore, it is desired to provide certain mechanisms for maintaining this predetermined travel constant and normally positioning the brake shoes relatively close but out of contact with the periphery of the wheel.

In order that a clearer perception of the present invention and a fuller understanding of the objects sought to be obtained may be had, it is to be noted that the present invention is designed more particularly for application to the power and floating levers of trucks of railway cars, although it is to be understood that it is applicable to other parts and types of foundation brake rigging as will be hereinafter more fully pointed out. In order to simplify and reduce the cost of equipment certain actuating and actuated parts are now more intimately combined and associated one with another to the elimination of certain elements and the incorporation of certain others to accomplish the objects above recited more satisfactorily.

The invention will now be described in detail in its application to a beamless brake as shown in Figs. 1 to 4 in which two adjacent wheels 15 of a truck are supported in a suitable frame 16, each wheel being provided with a brake shoe head 17. These brake shoe heads are pivotally connected directly upon live and dead levers 18 and 19 respectively. The dead lever 19 is pivotally supported at its upper end in one of the holes of an ear, not shown, but of usual construction, on the transverse bolster of the truck. The live lever 18 has its corresponding end preferably connected to one end of the pull rod which in turn is connected with any suitable source of power as the brake cylinder or hand brake not shown. The lower ends of the levers are connected in the present case by a compression member adapted to transmit the force applied and carry the brake shoes into contact with the periphery of the wheels from their normal position of rest in the usual manner. This compression member positioned between the lower ends of the live and dead levers is, as shown more completely in Figs. 1 to 4 inclusive, composed of two cylindrical telescoping parts, one of which is a solid rod 21 pivotally connected at 22 to the lower end of the live lever 18 and telescopes within a hollow cylindrical rod or barrel 23 pivotally connected at 24 to the lower end of the dead lever. The member 23 is provided with an enlarged chamber 25 as shown more clearly in Fig. 2 within which is positioned a holding device comprising two parallel dogs 26 having holes the edges of which are case hardened and through which the member 21 freely passes in one direction when the dogs are in working position. A spring 27 surrounds the member 21 and acts and reacts upon the adjacent surfaces of the end wall of the chamber 25 and the two dogs 26, thereby to maintain the same in normally canted or holding position, as shown. Suitable means are provided, not herein shown, for releasing and holding these dogs against a stop 28 at right angle position where they will permit a free relative movement of the rod 21 through their central apertures.

This device may be broadly termed a take up and holding device and merely illustrates one of the various forms of mechanisms adapted to accomplish the desired result, namely, a means for preventing an inward telescopic movement of the member 21 but permitting a free outward movement thereof. It is, of course, to be understood that other forms of holding mechanisms may be applied, such for example, as the compression member shown in my Patent No. 1,020,519 in which a plurality of shims are adapted to be interposed between the effective ends of the two parts comprising the compression member.

As the brake shoes become worn from time to time, the normal distance from their surfaces to the periphery of the wheels would, of course, increase and were it not for a slack adjuster, the positive travel of all levers would correspondingly increase thereby lessening the efficiency of the device.

An adjusting or operating mechanism is therefore incorporated with the operated or compression member above described to constantly increase the distance between the pivot points 22 and 24 and hold the surfaces of the brake shoes closely adjacent but just out of contact with the peripheries of the wheels. This adjusting device comprises in the present instance an L-shaped bar 30 having an elongated slot 31 at one end surrounding a pivot pin 32 supporting the brake shoe head 17. The purpose of this elongated slot 31 is primarily to establish a predetermined lost motion which must be taken up before the brake shoes contact with the wheels and also to permit the brake shoes to move out of contact with the wheels on release of the motive power.

The opposite end 33 of this adjusting rod passes through a friction clamp or clutch device as shown more clearly in Fig. 4. This clutch device comprises two plates 34 and 36 bolted together, or otherwise suitably secured by fastening devices 37 at opposite sides of the tubular cylindrical member 23. The edges of these members are rounded as shown by curved dotted lines in Fig. 1 to permit a pivotal movement of the operating rod as the brakes are actuated. It is also to be noted that a flange 38 projects to one side of the member 23 to prevent a relative rotary movement of the clutch device thereabout. The tension with which the clamping members 34 and 36 engage the end of the rod 33 may be regulated by the fastening devices and it is normally sufficient to permit a frictional yielding sliding movement of the member 33 therethrough when moving in one direction but normally to carry the member 23 toward the right when moving in the opposite direction only after the load springs are again righted on the release of the power levers.

In order that this important distinguishing feature may be thoroughly understood, a brief statement of the operation of a slack adjuster of the type shown in Figs. 1 to 4 inclusive is as follows: On application of the brakes the upper part of the live lever is moved toward the left which simultaneously causes the adjacent brake shoe to move into contact with the periphery of the adjacent wheel and react through the operated compression member to carry the opposite brake shoe into engagement with the wheel by reacting upon the fixed fulcrum of the dead lever. In actual operation, on trucks such as the Ajax type or brake rigging permitting it there is a movement of the brake shoes and adjacent rigging downwardly as well as toward the wheels which will cause a yielding sliding movement of the rod through the friction clamp irrespective of any material wear of the brake shoes.

As the brake shoes move because of wear beyond the predetermined lost motion theoretically allowed by the slot 31, the pin 32 will further act upon the L-shaped adjusting member 30 and cause the parts 33 to slide relatively between the friction clutch members 34 and 36 to take up the exact amount of excess or false travel occurring upon opposite brakes. On release of the brakes, the parts tend to return to normal position under the action of the usual return springs mounted upon the truck bolster to return the levers and carry the brake shoes out of contact with the wheels. During the return of the parts to normal position the pin 32 moves to the right of the slot 31 shown in Fig. 1 and the rod 33 slides through the yielding friction clutch, approximately the amount necessary to make the brake application not including the excess travel for wear for any predetermined stroke, then as the upper end of the live lever continues its movement to full return position toward the right, the shoes drop away from the wheel and the lower end of the lever moves toward the left and tends to expand the compression member an amount exactly equal to the excess or false travel. It is at this point that the yielding friction clutch comes into play to hold the barrel while the rod 21 is pulled out.

In Figs. 5 and 6, there is shown two modified forms of slack adjusters by themselves, both of which are applicable to either beam or beamless trucks now in general use without material modification.

Referring more particularly to Fig. 5, the two telescopic members 21 and 23 are substantially the same as that described in connection with Figs. 1 to 4 inclusive and are connected at their ends with the lower ends of the live and dead levers respectively. A take up box 25 is provided on one of the members having means adapted to co-act with the other. An L-shaped adjusting rod 41 is provided at one end with an elongated slot 42 surrounding the pivot pin 43 passing through the live lever. The opposite end of the member 41 is provided with a slot 44 through which passes a pin 45 secured to the barrel member 23, as shown in Fig. 10. This pin 45 is provided with washers 46 held in close contact by a spring 47 locked in place by pin 48. The washers engage the L-shaped member 41 at opposite sides of the slot 44 and hold the same against such movement as might be ordinarily caused by the jolting of the cars, yet permit a relative movement upon release of the brakes as above described. A set screw 49 may be provided in the slot 42 to regulate the lost motion at this point, if so desired.

Fig. 6 shows a reversal of this construction, that is a friction clamp yieldable in both directions, is provided upon the pivot pin 43, in a manner similar to that shown in Fig. 10 adapted to engage opposite sides of the slot 50 at the upper end of the adjusting member 51. The friction clamp at this point performs substantially the same function as that provided at the point 46 in the modification shown in Fig. 5. The opposite end of this lever is provided with a pivoted lost motion device 52 engaging an elongated slot 53 to provide the predetermined lost motion between the brake shoes and the periphery of the wheels. This pivoted lost motion device comprises little more than a stud passing through the slot 53 and provided with a cotter pin or other holding device 54 at its outer end.

In Fig. 7, there is shown another slight modification of the slack adjuster as applied directly to the cylinder levers of the brake rigging. In this modification a cylinder 60 is provided at one end with a piston 61 pivotally connected to one end of a live or power lever 62, the opposite end of which is connected by means of a pull rod 63 with the brake rigging of one truck. At the other end of the cylinder is pivotally connected a dead lever 64 and its opposite end is provided with a pivotally connected pull rod 65 leading to the brake rigging on the truck at the other end of the car. Disposed in parallel relation to the cylinder 60 and adapted to form fulcrums therefor is a tension member 66 comprising two telescoping parts substantially the same in construction as that shown in Fig. 1, except the dogs are reverse in action. A take up box 67 is mounted on one part provided with shims or dogs adapted to co-act with the other to prevent a movement in one direction, yet permit a free movement in the opposite direction as when expanding in replacing the brake shoes. About the barrel 66 is positioned a pivoted yielding friction clamp device 68 engaging a rod 70, the opposite end of which is provided with a slot 71 surrounding a pin 72 upon the power lever 62. When the power lever exceeds its predetermined travel provided for by this slot, it tends to move the rod bodily toward the left, causing its opposite end to slip yieldingly through the friction clutch 68. On release of the brakes, however, the power lever returns to normal position and the pin 72 engages the right hand end of the slot 71 and instead of bodily moving the adjusting rod relatively to the barrel, it causes the barrel to stand stationary as to the other lever and the plunger telescopes therein to the left and the shims or dogs take up the exact amount of wear upon the internal telescopic member.

In Fig. 8, there is shown a still further modification in which a single power lever 75 is used together with a pull rod 76 pivotally connected at one end and a compression member 77 pivotally connected at its opposite end; the principal difference being the absence of the dead lever at the opposite end of the compression member which instead is attached to an equalizer bar 78. The slack adjuster feature, however, is almost identical to that above shown and described in connection with Figs. 1 to 4 inclusive and needs no further detailed explanation. A return spring 79 is mounted on pivoted rod 80 to insure a complete return of the live lever 75 to normal position against the stop 81 on the car bolster.

In Fig. 9, there is shown a still further modification in which the intervening compression member is eliminated as might occur in a two wheeled or single truck applied to what is familiarly known as the radial truck. This modification shows a truck frame 85 having a half ball hanger 86 supporting the brake shoe head 87. A live lever 88 is pivotally supported at 89 upon the truck frame and is connected at its upper end with a pull rod 90 to any convenient source of power. The lower end of this lever is pivotally connected at the point 91 with a take up box 92 through which passes a holding rod 93 engaging the brake shoe head 87 at one end. This adjusting device is the same in principle as that shown and described above in connection with Fig. 1, except that the friction clamp may be eliminated, the half ball joints performing an equivalent function. Dogs 94 shown in dotted lines are adapted to co-act with the cylindrical rod 93 when moved in one direction but permit a free relative movement in the opposite direction.

The half ball frictional hangers shown in Fig. 11 are of such construction as to oppose a free return of the brake shoe beyond the periphery of the wheel. As all wheels are more or less uneven and there is some looseness to the several pivotal connections, the treads of the shoes will clear the actual surface of the wheel and prevent any material drag thereon. Consequently when the brake levers are returned to normal position on release of the former and the brake shoes are arrested in their return movement, the take up box 94 will move longitudinally over the rod 93 some slight distance to the left exactly equal to the amount of wear upon the brake shoes. When the brakes are next applied, the dogs 94 will bite into the rod and carry the brake shoes immediately into engagement with the wheel.

It will be noted that all of these modifications operate on substantially the same principle and that the reiteration of the method of operation described in connection with Fig. 1 is believed to be unnecessary.

The parts are all substantial and durable in construction and are so accurately and positively arranged and connected one with another as to cause an exact and definite movement of the take up mechanism equal to the wear or false movement of the brake shoes. The parts are more or less concealed and protected from atmospheric conditions, thereby being reliable and efficient at all times. The adjusting rod being made in substantially one part and having a positive connection with one of the members and a frictional yielding connection with the other reduces the liability of tight brakes and greatly lessens the chance of breakage as might occur when the mechanisms are constructed with a positive clutch moving freely only in one direction.

It is therefore believed that the present invention provides a simple and practical device adapted to accomplish, among others, all the advantages and objects above set forth.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

What I claim is:

1. In a slack adjuster for brake rigging, in combination, a live lever, a dead lever, an automatically extensible adjustable coupling bar connecting said levers, and an adjusting rod connecting one of said levers to the coupling bar, said adjusting rod having frictional yielding engagement with one of said parts adapted to give in either direction.

2. In a slack adjuster for brake rigging, in combination, a live lever, a dead lever, an automatically extensible adjustable coupling bar connecting said levers near their ends, and an adjusting rod directly connecting one of said levers with one of the parts of said coupling bar, said adjusting rod having a frictional pivotal engagement with said coupling bar yieldable in both directions.

3. In a slack adjuster for brake rigging, in combination, a power lever, an automatically extensible connecting bar, and a lost motion adjusting rod connecting said power lever to said connecting bar, said adjusting rod having a yielding frictional contact with the connecting bar whereby it may move relatively in either direction.

4. In a slack adjuster for brake rigging, in combination, a power lever, an automatically extensible coupling bar adapted to operate upon brake rigging, and a lost motion adjusting rod connecting said power lever to said connecting bar, said adjusting rod having a frictional connection with said coupling bar yieldable in both directions.

5. In a slack adjuster for brake rigging, in combination, brake levers, a sectional extension bar connecting said levers, a secondary connection between one of the sections of said bar and one of said levers, a yieldable friction clutch associated therewith arranged to engage and extend or draw out the connecting bar, and a positive clutch arranged between the effective ends of the sectional extension bar, said friction clutch being constructed to permit relative movement of its parts during both the application and release of the brakes to accommodate the rigging to the excess travel beyond predetermined lost motion.

6. In a slack adjuster for brake rigging, in combination, brake levers, a telescoping connecting bar having a sleeve section, a positively acting clutch associated with said sleeve section adapted to co-act with the telescoping section, and a secondary connection between said sleeve section and one of the brake levers, said secondary section having a frictional contact with one of the parts yieldable in both directions and arranged to extend or draw out the telescoping rod.

7. In a slack adjuster for brake rigging, in combination, brake levers, a telescoping two-part connecting bar, a positively acting clutch mechanism associated with one part adapted to co-act with the other, and a secondary connection between one of the telescopic sections and one of the brake levers and having a frictional connection at one end yieldable in both directions.

8. In a slack adjuster for brake rigging, in combination, brake levers, a two-part telescoping connecting bar connecting the lower ends of said brake levers, a positively acting holding means associated with one of said parts and acting upon the other adapted to positively prevent movement in one direction, and a secondary connection between one of the brake levers and one of the sections of said connecting rod and having a frictional engagement with the latter yieldable in both directions, said secondary connection having a lost motion device at its opposite end.

9. In a slack adjuster for brake rigging, in combination, brake levers, a sectional telescopic extension bar connecting the lower ends of said brake levers, a housing associated with one of said parts, a plurality of reversible friction dogs within said housing adapted to co-act with the telescopic portions of said bar and adapted to hold the parts against movement in one direction, and an adjusting rod secured to the outer section of said extension bar and having a yielding frictional pivotal connection therewith, the opposite end of said adjusting rod being provided with a lost motion connection with one of the brake levers.

10. In a slack adjuster for brake rigging, in combination, brake levers, a two-part extension bar connecting the ends of said brake levers, an automatically operating adjusting rod connected at one end to one of said levers and having a yielding frictional contact with one of the parts of said extension bar, said yielding contact comprising two surfaces gripping the sides of said adjusting rod to permit movement in both directions.

11. In a slack adjuster for brake rigging, in combination, brake levers, a two-part extension bar connecting the ends of said brake levers, an automatically operating adjusting rod connected at one end to one of said levers and having a yielding frictional contact with one of the parts of said extension bar, said yielding contact comprising two surfaces gripping the sides of said adjusting rod and means for varying the degree of pressure with which said parts bear upon said rod.

12. In a slack adjuster for brake rigging, in combination, brake levers, a two-part extension bar connecting the ends of said brake levers, an automatically operating adjusting rod connected at one end to one of said levers and having a yielding frictional contact with one of the parts of said extension bar, said yielding contact comprising two members gripping opposite sides of said adjusting rod to permit movement in both directions, and means adapted to prevent relative rotation of said frictional device about said extension bar.

13. In a slack adjuster for brake rigging, in combination, brake levers, a bar connecting the lower ends of said levers comprising two telescopic members adapted to move freely in one direction only, an adjusting rod connected with one of said levers and provided with an adjustable lost motion slot, the other end of said adjusting rod being provided with a yielding frictional pivotal connection with the bar whereby the rod may rotate slightly in said connection as the brakes are actuated and move longitudinally in both directions relatively to said connection as may be necessary.

14. In a slack adjuster for brake rigging, in combination, a brake lever having a brake shoe head, an automatically operating two-part telescopic member connected to the lower end thereof, means comprising a housing and positively acting friction dogs therein adapted to permit a free relative movement of one of said parts with respect to the other in one direction, and means adapted to oppose a return of the brake shoe head from the wheel, said last mentioned means comprising a pivotal frictional device permitting movement in both directions.

15. In a slack adjuster for brake rigging, in combination, a brake lever having a brake shoe head, an automatically operating two-part telescopic member connected to the lower end thereof, means adapted to permit a free relative movement of one of said parts with respect to the other in one direction, and means adapted to oppose a return of the brake shoe head from the wheel, said last mentioned means comprising a pivotal frictional device yieldable in both directions.

In testimony whereof I affix my signature in presence of two witnesses.

WILLIAM H. SAUVAGE.

Witnesses:
ROBY J. PRIDDY,
PIERCE M. CLEAR.